(12) United States Patent
Kimmelmann et al.

(10) Patent No.: US 11,674,574 B2
(45) Date of Patent: Jun. 13, 2023

(54) COAXIAL GEAR

(71) Applicant: WITTENSTEIN SE, Igersheim (DE)

(72) Inventors: Martin Kimmelmann, Weikersheim (DE); Andreas Kümmeth, Obernbreit (DE); Michael Schmidt, Reichenberg (DE); Thomas Rossmeißl, Künzelsau (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 17/546,203

(22) Filed: Dec. 9, 2021

(65) Prior Publication Data

US 2022/0178430 A1   Jun. 9, 2022

(30) Foreign Application Priority Data

Dec. 9, 2020   (DE) .................. 10 2020 132 794.3

(51) Int. Cl.
*F16H 49/00*   (2006.01)
*F16H 37/02*   (2006.01)

(52) U.S. Cl.
CPC ........... *F16H 37/02* (2013.01); *F16H 49/001* (2013.01)

(58) Field of Classification Search
CPC .. F16H 25/06; F16H 49/001; F16H 2049/003; F16H 2049/006; F16H 2049/008
See application file for complete search history.

(56) References Cited

U.S. PATENT DOCUMENTS

| 8,656,809 B2 | 2/2014 | Bayer et al. | |
| 2003/0047025 A1* | 3/2003 | Ruttor | F16H 49/001 74/640 |
| 2009/0205451 A1* | 8/2009 | Bayer | F16H 25/06 74/439 |

(Continued)

FOREIGN PATENT DOCUMENTS

| CN | 110645334 A | * | 1/2020 |
| DE | 3930064 A1 | | 3/1991 |

(Continued)

OTHER PUBLICATIONS

Extended European search report for patent application No. 21213038.9 dated Feb. 11, 2022.

*Primary Examiner* — Joseph Brown
(74) *Attorney, Agent, or Firm* — Bachman & LaPointe, P.C.

(57) ABSTRACT

A coaxial gear (1), includes an axially oriented tooth system (5) with respect to a rotational axis (3) of the coaxial gear (1), a tooth carrier (7) having axially oriented guideways (9), tooth pins (11) received within the guideways (9) for engaging with the tooth system (5), wherein the tooth pins (11) are axially oriented within the guideways (9) by their respective longitudinal axes and are mounted within the guideways (9) in an axially displaceable manner, and a cam disc (15) rotatable about the rotational axis (3) for axially driving the tooth pins (11), wherein a plurality of bearing segments (17) is disposed between the cam disc (15) and the tooth pins (11) for bearing the tooth pins (11), and wherein, on a side facing the tooth pins, the bearing segments (17) have an elevation at least in sections formed as a spherical cap for bearing the respective tooth pin (11).

16 Claims, 4 Drawing Sheets

(56) References Cited

U.S. PATENT DOCUMENTS

| | | | | |
|---|---|---|---|---|
| 2010/0024593 A1* | 2/2010 | Schmidt | ............... | F16H 25/06 74/640 |
| 2016/0298747 A1 | 10/2016 | Schreiber et al. | | |
| 2018/0209530 A1* | 7/2018 | Schreiber | ............... | F16H 25/06 |
| 2021/0131546 A1 | 5/2021 | Schreiber et al. | | |

FOREIGN PATENT DOCUMENTS

| | | | | |
|---|---|---|---|---|
| DE | 102006042786 A1 | | 3/2008 | |
| DE | 102015004405 A1 * | | 10/2016 | ............ F16H 25/06 |
| DE | 102015105524 A1 | | 10/2016 | |
| DE | 102015119583 A1 * | | 5/2017 | ............ F16H 1/32 |
| DE | 102019129662 A1 | | 5/2021 | |
| DE | 102019129667 A1 | | 5/2021 | |
| JP | 61112854 A | | 5/1986 | |
| WO | 2021036148 A1 | | 3/2021 | |

* cited by examiner

COAXIAL GEAR

BACKGROUND OF THE INVENTION

The invention relates to a coaxial gear.

Gears are known from the state of the art, which comprise tooth pins mounted in a tooth carrier in an axially displaceable manner. For driving the tooth pins, driving elements having a profiling are used. The tooth pins are moved in axial direction and engage into a tooth system in such a manner that a relative movement between the tooth carrier having the tooth pins and the tooth system is induced. The relative movement between the tooth system and the tooth pins is in this case by at least one magnitude smaller than the movement of the driving element with the profiling. In this manner, high transmission ratios may be achieved, an example of such a gear being published in DE 10 2006 042786 A1.

Hitherto known solutions from the state of the art, however, have restrictions with respect to transmitting torques or have a high number of individual parts or require a complex assembly.

SUMMARY OF THE INVENTION

A task of the invention is to propose a coaxial gear, which is improved with respect to coaxial gears known from the state of the art, wherein in particular a transmission ratio of higher torques or a compact structure or an improved rigidity or low wear is intended to be achieved.

The task is solved by means of a coaxial gear as disclosed herein. Advantageous further developments and embodiments will result from the independent claims and this description.

One aspect of the invention relates to a coaxial gear having a tooth system axially oriented relative to a rotational axis of the coaxial gear, and a tooth carrier having axially oriented guideways, tooth pins, which are accommodated in the guideways for engaging with the tooth system, wherein the tooth pins are axially oriented with their respective longitudinal axes within the guideways and are mounted within the guideways in an axially displaceable manner, and a cam disc rotatable about the rotational axis for axially driving the tooth pins, wherein a plurality of bearing segments is disposed between the cam disc and the tooth pins for bearing the tooth pins, and wherein, on a side facing the tooth pins, the bearing segments have an elevation at least in sections formed as a spherical cap, for bearing the respective tooth pin.

Typically, terms such as "axial", "radial", or "circumferential direction" are to be understood herein with respect to the rotational axis of the coaxial gear, for example, with respect to the rotational axis of the cam disc of the coaxial gear.

Typically, each of the tooth pins of the coaxial gear is respectively mounted on one of the bearing segments. In further typical embodiments, in each case at least one tooth is mounted on one of the bearing segments, for example, in each case at least two tooth pins.

In typical embodiments, the tooth pin has a recess on its tooth base on the bearing segment side, which recess is formed at least in sections as a concave spherical shape, in particular a spherical section. In this manner, a line or surface contact with the spherical cap of the bearing segment may be achieved. Typically, the tooth pin comprises the tooth base in a second end area of the tooth pin facing the cam disc.

Typically, a contact between the tooth pins or their recesses and the respective spherical cap takes place on the lateral shell surfaces of the spherical cap. Since no contact occurs typically at the tip of the elevation, the upper end of the elevation is of no substantial importance; the elevation may be formed there to have a flattened radius or to be planar, for example.

Typically, the radius of the spherical cap of the elevation of the bearing segment is different, in particular larger, with respect to the sphere radius of the recess of the tooth base of the tooth pin. In this manner, a defined line contact between the spherical cap and the tooth base is achieved.

The spherical cap typically allows tilting between the tooth pin and the bearing segment about two axes. This is advantageous in typical embodiments, in particular in case of an inclination of the profiling of the cam disc about two axes. Furthermore, the bearing segments are prevented from displacing from one another in the circumferential and radial direction; typically, the tooth pins guided within the guideways retain the bearing segments within their respective positions. By means of the spherical cap, a line contact or surface contact between the tooth pin and the bearing segment for compensating the inclination of the bearing segment may be achieved corresponding to the profiling of the cam disc both in the circumferential direction and the radial direction.

In typical embodiments, the guideways of the tooth carrier are axially oriented with respect to the rotational axis of the coaxial gear. Typically, the tooth pins are mounted within the guideways of the tooth carrier in an axially displaceable manner. Typically, a tooth pin is mounted within the guideway of the tooth carrier to be axially displaceable in just one direction, typically in the direction of the longitudinal axis of the tooth pin. This can be achieved, for example, by the tooth pin having a constant cross-section over a determined length, in particular over a determined length of the body along the longitudinal axis of the tooth pin. The tooth pins may be accommodated within the guideway such that the tooth pin is mounted along the longitudinal axis within the guideway in an axially displaceable manner with respect to the rotational axis of the coaxial gear. Typically, a guideway for a tooth pin within the tooth carrier is realized as a bore or opening having a constant cross-section in the axial direction. The bore or opening typically is formed continuously through the tooth carrier in the axial direction. Further typical tooth carriers comprise rectangular milled formations or oblong holes or slots as guideways. In typical embodiments, the tooth carrier encompasses the rotational axis in the circumferential direction. The tooth carrier may in particular be formed to be circular or annular.

In typical embodiments, the coaxial gear comprises a cam disc rotatable about the rotational axis for axially driving the tooth pins. Typically, the cam disc comprises a profiling as the driving element for axially driving the tooth pins, in particular by an axial stroke of the tooth pins. Typically, the profiling is realized along the circumferential direction of the cam disc with at least one elevation in the axial direction, in particular with at least two or at least three elevations. Typically, the profiling of the cam disc follows a coil surface in sections or is formed to be curved in the circumferential direction. Typically, the cam disc, the tooth carrier, and the tooth system are disposed in this order in an axial direction. Due to driving the cam disc with the profiling, a force may be exerted upon the tooth pins in the direction of the respective longitudinal axis of the tooth pins so that the tooth pins are pressed in the direction of the tooth system within the guideways of the tooth carrier.

Typical coaxial gears comprise an axially oriented tooth system, the tooth system may in particular be realized as tooth system of a crown wheel. The tooth system typically comprises tooth system teeth, which are disposed in a row in the circumferential direction. The tooth system teeth each typically comprise two tooth system flanks.

Typical coaxial gears have a drive shaft and a output shaft. Typically, the drive shaft and the output shaft are mounted to be rotatable about the rotational axis of the coaxial gear. Typically, the drive shaft or the output shaft or both of them are realized as hollow shafts. Typically, the cam disc is provided on the drive shaft. In typical embodiments, the tooth carrier is provided on the output shaft, wherein in particular the tooth system or a crown wheel having the tooth system is connected in a rotationally fixed manner to a housing of the coaxial gear or is not rotatable relative to the housing. In further typical embodiments, a tooth system or a crown wheel having the tooth system is provided on the output shaft, wherein a tooth carrier in particular is connected in a rotationally fixed manner to a housing of the coaxial gear or is not rotatable relative to the housing.

In typical embodiments, the tooth pins each comprise a body mounted within a guideway of the tooth carrier in an axially displaceable manner. Typically, the body extends along the longitudinal axis of a tooth pin. The longitudinal axis of the tooth pin is typically oriented at least substantially in parallel to the rotational axis of the coaxial gear. Typically, the body is at least in part received within a guideway of the tooth carrier. The body may have an at least substantially constant cross-section along the longitudinal axis of the tooth pin. In typical embodiments, a cross-sectional surface of the body, which is perpendicular to the longitudinal axis of the tooth pin and here also called "second cross-sectional surface", is formed to be round. In particular, the cross-sectional surface of the body may be formed to be circular. Typically, the body is at least substantially formed to be cylindrical. In further typical embodiments, the body has an at least in part non-round cross-sectional surface, for example, a polygonal cross-sectional surface or a round cross-sectional surface having at least one flattening, in particular a circular cross-sectional surface having at least one flattening.

Typically, at least a part of the tooth pins is realized in a bend-proof manner. The term "bend-proof" is in this case to be understood in the technical way, which means that bends of the tooth pins, due to the rigidity of the material of the tooth pins, are so small that they are at least substantially insignificant for the kinematics of the coaxial gear.

In embodiments, the tooth pin comprises a tooth pin base in an end area of the tooth pin facing the cam disc. The tooth pin base is typically arranged for bearing the tooth pin on a bearing segment of the coaxial gear. In embodiments, the bearing segments are made of metal. In further embodiments, the bearing segments may be made of plastics.

In typical embodiments, the tooth pins each comprise a head area. The head area typically comprises at least one tooth for engaging with the tooth system. A tooth typically comprises two tooth flanks. Typically, the tooth comprises a tooth head. The tooth head typically constitutes the transition between the two tooth flanks of the tooth. The tooth head is typically rounded. Typically, the tooth head is oriented at least substantially in a radial manner. Between the body of a tooth pin and the at least one tooth, the head area typically comprises a base. Typically, the at least one tooth is disposed on the base, in particular on a side of the base facing the tooth system.

Typically, the head area is formed to be widened with respect to the body in the circumferential direction about the rotational axis. The head area may in particular be formed to be widened in one circumferential direction of in both circumferential direction with respect to the body. In particular, the head area may be widened with respect to the body in a mirror-symmetrical manner relative to a symmetry plane that is parallel to the longitudinal axis of the tooth pin and oriented radially relative to the rotational axis.

In embodiments, the head area is formed to be widened with respect to the body in the radial direction. The head area may be widened radially to the inside or radially to the outside with respect to the rotational axis of the coaxial gear, in particular radially to the inside and radially to the outside. A widening of the head area may in particular offer the advantage that an engaging surface for engaging the at least one tooth of a tooth pin with the tooth system is enlarged. In further typical embodiments, the head area in the radial direction is substantially of equal width as the body.

In typical embodiments, a first cross-sectional surface of the head area, which cross-sectional surface is perpendicular to a longitudinal axis of the tooth pin, comprises two radially oriented edges relative to the rotational axis. Typically, the first cross-sectional surface of the head area is a cross-sectional surface of the base of the head area. The radially oriented edges may enclose the separation angle of the tooth pins in the circumferential direction, in particular relative to the rotational axis. In typical embodiments, the first cross-sectional surface is limited radially towards the inside or radially towards the outside by a circular arc or a straight line, for example, by a circular arc towards radially outside and by a straight line towards radially inside.

In embodiments, the first cross-sectional surface of the head area constitutes at least in part a trapezoid, a circular ring portion or a circular partial surface. In embodiments having a first cross-sectional surface formed as a trapezoid, the trapezoid may comprise two radially oriented edges relative to the rotational axis. The trapezoid may comprise at least one chord of a circle having a center point in the rotational axis. In embodiments having a first cross-sectional surface formed as a circular partial surface, the circular partial surface may comprise two circular arcs, for example, in particular two circular arcs of a circle having the center point in the longitudinal axis of the tooth pin. The circular partial surface may be limited by two edges radially oriented relative to the rotational axis. Embodiments having a circular partial surface as the first cross-sectional surface may be manufactured as a turned part.

In typical embodiments, the head area comprises one single tooth, in particular one single tooth having exactly two tooth flanks. The single tooth typically has a tooth width in the circumferential direction, which is wider than the body diameter of the body in the circumferential direction. In particular, the tooth width may at least substantially be equal to the head area width of the head area. A single tooth, in particular a wide single tooth may provide high overlapping of the tooth system or low transmission ratios.

In typical embodiments, the head area comprises at least two teeth for engaging with the tooth system, in particular at least three or at least four teeth. Typically, the head area comprises a maximum of 15 teeth, in particular a maximum of 10 teeth, or a maximum of 8 teeth. The teeth typically each comprise two tooth flanks. The teeth are typically disposed in a row in the circumferential direction. Typically, the tooth heads of the teeth are radially oriented. The tooth pins typically each have the same number of teeth. Tooth pins having more than one tooth may offer the advantage that the tooth pins for engaging the teeth with the tooth system may be operated at a low tooth stroke. In particular, bending loads may be reduced, for example, within the tooth pins or in a bearing of the tooth pins on the cam disc.

Typically, a tooth separation angle of the at least two teeth of the head area of a tooth pin is at least substantially equal or equal to a multiple of a tooth system separation angle of the tooth system, in particular at least substantially equal to an integer multiple. The tooth separation angle is determined, for example, by the angle enclosed by two teeth adjacent in the circumferential direction, in particular tooth heads of the adjacent teeth of a head area with respect to the rotational axis. The tooth system separation angle of the tooth system is calculated, for example, as 360° divided by the number of tooth system teeth of the tooth system.

In typical embodiments, the total number of the teeth of the tooth pins of the coaxial gear is unequal to the number of the tooth system teeth of the tooth system. Typically, an arithmetical number of teeth is unequal to the number of the tooth system teeth of the tooth system. The arithmetical number of teeth is in particular determined as the closest integer multiple of the number of tooth system teeth of the number of the guideways or the number of the tooth pins. In embodiments, the arithmetical teeth number differs by the number of the elevations of the cam disc from the number of the tooth system teeth of the tooth system. Typical coaxial gears may be arranged to provide a transmission ratio of the coaxial gear of at least 3, in particular of at least 4 or at least 5, or of a maximum of 250, in particular of a maximum of 220 or a maximum of 200.

In typical embodiments, tooth flanks of a tooth pin or tooth system flanks of the tooth system, in particular the tooth flanks and the tooth system flanks run at least in part along helical curves around the rotational axis. Typically, two tooth flanks of one tooth or two tooth system flanks of one tooth system tooth taper along respective flank curves in the direction of the rotational axis of the coaxial gear. In embodiments, a tooth flank or a tooth system flank may run at least in part along a coil surface. In particular, a planar engagement of the tooth flanks and the tooth system teeth may be provided. In embodiments with tooth pins having each at least two teeth, identical engagement rations at an identical axial stroke may be provided in an advantageous manner with an engagement with the tooth system for the at least two teeth.

In typical embodiments, the tooth pin comprises a tooth body between the tooth head and the tooth base. The tooth body extends along the longitudinal axis of the tooth pin over a body length. Apart from lubricating channels or similar, the tooth body typically has at least substantially a constant cross-section.

In typical embodiments, a plurality of bearing segments is disposed between the cam disc and the tooth pins. Typically, the bearing segments are arranged for bearing the tooth pins on the cam disc. In typical embodiments, the bearing segments are disposed in a ring-shaped manner. Typically, the bearing segments are disposed adjacent to one another in the circumferential direction.

Typically, rolling elements are disposed between the cam disc and the bearing segments. The spherical caps enable the bearing segments to be tilted relative to the tooth pins about two axes, so that the friction-reducing or bearing load-increasing use of rolling elements is enabled.

Typically, the center point of the spherical cap coincides at least substantially with the running surface of the bearing segment. The center point is typically the center point defined by a radius of the spherical cap. This enables the running smoothness to be increased.

Typically, the rolling elements are formed as cylindrical rollers. In typical embodiments, the rolling elements are disposed with their longitudinal axis at least substantially perpendicular to the rotational axis of the gear. In typical embodiments, the rolling elements may be guided in a cage, which is suitable to follow the stroke of the cam disc in a permanently elastic manner. Typical cages are composed of POM, PA, PEI, PPS, PK, or PEEK.

In typical embodiments, the bearing segments have in the circumferential direction in particular straightly formed edges each running along a radius. Typically, the circumferential direction designates a direction, which is at least substantially identical to a running direction or movement direction of the rolling elements around a rotational axis of the coaxial gear. In further embodiments, the edges are realized to be wave-shaped or to be not straight in general in the circumferential direction.

Typically, the bearing segments have a running surface facing away from the tooth pins, in typical embodiments thus have a running surface facing the rolling elements, respectively having introduction chamfers in the area of the edges in the direction of revolution. These usually have a rounded transition to the running surface. By means of the introduction chamfers, stabilization of the rolling of the rolling elements may be achieved or edge wearing may be reduced at the bearing segments.

Typical bearing segments of embodiments have an enlarged base surface with respect to the tooth base. This may contribute to enlarging the contact surface on the rolling elements and thus to a better running smoothness or load distribution.

Typically, the cam disc has a profiling having a variable inclination angle in the radial direction to the rotational axis. Typically, the inclination angle designates herein the radially oriented proportion of a straight line standing perpendicular on the profiling at a point, which is the vertical profiling line, with respect to the rotational axis of the coaxial gear. The background is that the profiling typically has a variable inclination in two directions: in the circumferential direction for driving the tooth pins within the guideways, and in the radial direction for establishing a Hertzian line contact of respectively one bearing segment with at least two rolling elements.

Typical inclination angles or the previously defined radial proportion of the angle to the rotational axis are in the range of up to 10° in both directions, typically up to 3° in both directions.

When put together, the bearing segments typically constitute a circular ring. Typical bearing segments may be realized as circular ring portions, in a trapezoid shape having straight outer or inner edges or both, or having a substantially round cross-section, wherein the edges are flattened in the circumferential direction.

Typical embodiments comprise an anti-twist ring, which is disposed between the tooth pins and the bearing segments and prevents in particular the tooth pins from rotating about their respective longitudinal axis, typically with respect to the anti-twist ring. In typical embodiments, the anti-twist ring is formed in the shape of a circular ring revolving about the rotational axis and comprises openings for receiving the tooth pins. Typical anti-twist rings of embodiments are realized to be elastic, e.g. of plastics, in particular of POM, PA, PEI, PPS, PK, or PEEK. This allows adapting to the deformation during the revolution of the cam disc to be achieved.

Typical tooth pins of embodiments have a circular tooth body in cross-section, and a non-circular cross-section in the area of the tooth base for engaging with a correspondingly shaped opening in the anti-twist ring. Typical cross-sections of embodiments of the tooth base comprise a lateral flattening for the anti-twist protection of the entire tooth pin about its longitudinal axis due to engaging into an opening of the anti-twist ring. Typical embodiments provide for a form closure in the area of the tooth base. An anti-twist protection may in particular ensure that the tooth pin is not twisted in the unloaded state with respect to the tooth system. In this manner, reliably plunging into a next gap of the tooth system may be guaranteed.

In typical embodiments, the anti-twist ring prevents the bearing segments from twisting relative to one another, in particular from twisting about an axis in parallel to the rotational axis of the gear or about a longitudinal axis of the tooth pins. Furthermore, the anti-twist ring may serve as an assembly aid for the pivot segments. For this purpose, the pivot segments typically are inserted into the anti-twist ring for assembly, and then are pushed conjointly upon the tooth segments already present within the tooth carrier.

Typically, the anti-twist ring comprises lugs in the direction of the cam disc for positionally securing the bearing segments. The lugs may also be designated as reliefs. Typically, the lugs engage into corresponding rim shapes within or in the rim area of the bearing segments. Exemplary rim shapes may be flattened corners or grooves in edges.

Typical embodiments of the coaxial gear may offer the advantage as compared to the state of the art that the coaxial gear is able to transmit a higher torque. In particular, a larger hollow shaft or a larger bearing may be built-in.

Another aspect of the invention relates to a coaxial gear mechanism, with a toothing system which is oriented axially with regard to a rotational axis of the coaxial gear mechanism; a tooth carrier with axially oriented guides; teeth which are received in the guides for engagement with the toothing system, the teeth being oriented axially with their respective longitudinal axes in the guides, and being mounted in the guides such that they can be displaced axially; a cam disc which can be rotated about the rotational axis for the axial drive of the teeth; and a housing, in which a setting element for mounting the cam disc is provided, at least one bearing with rolling bodies being arranged between the setting element and the cam disc.

In typical embodiments, the rolling bodies lie directly on a cam disc bearing face of the cam disc or directly on a setting element bearing face of the setting element. In further embodiments, the rolling bodies lie directly on both of the said faces. In typical embodiments, the setting element is configured as a bearing ring, in particular of a bearing for axial mounting of the cam disc, with a setting element bearing face. The setting element is typically configured such that it can be advanced axially, that is to say its axial position can be changed in relation to the housing in order to set a backlash of the gear mechanism. In the operating state, the setting element is connected fixedly to the housing for conjoint rotation. A further possibility for changing the axial position of the setting element or its bearing plane, on which the rolling bodies lie, can be a replacement of the setting element or a change of a thickness of the setting element.

With typical coaxial gear mechanism the setting element can be adjusted axially by a displacement nut, wherein the displacement nut is in a screwing engagement with the housing. Typically, the setting element is axially supported by an abutment bearing pot, the abutment bearing pot being axially supported by the displacement nut. The abutment bearing pot can also be constructed as integral with the setting element.

Advantages of typical embodiments can be a large hollow shaft opening, the capability for the transmission of high torques, and a great rigidity, for example by way of direct transmission of force in the coaxial gear mechanism, a small overall length and the possibility of setting a zero backlash, for example by setting of the setting element. This results generally in the possibility of setting the backlash in typical embodiments. A further advantage of embodiments can be a simplified assembly.

BRIEF DESCRIPTION OF THE DRAWINGS

Hereinafter, the invention will be explained in more detail on the basis of the appended drawings, wherein the Figures show.

DETAILED DESCRIPTION

Figure 1:
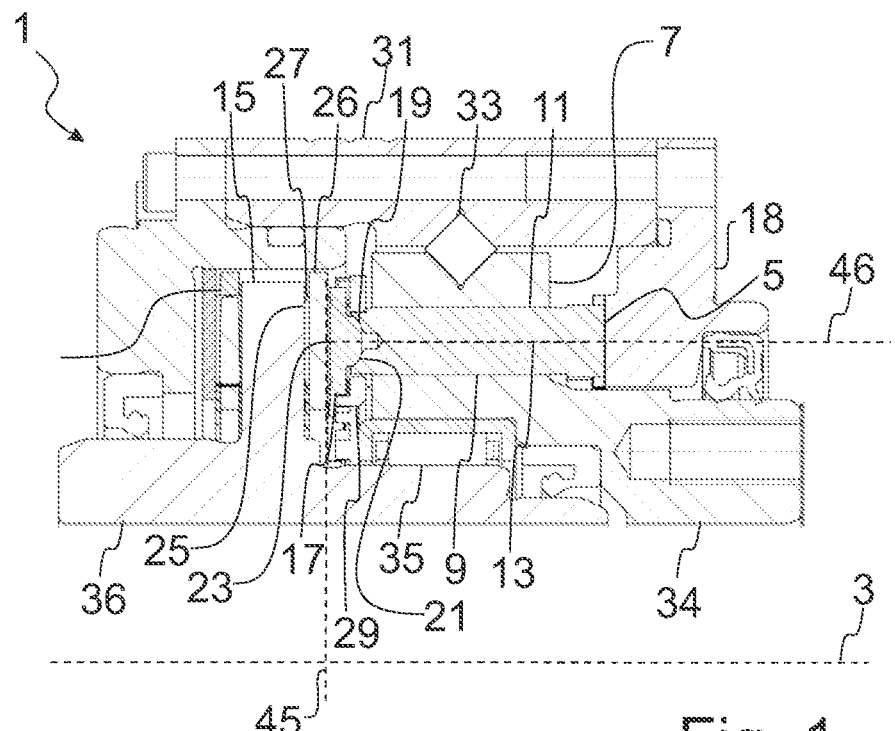
FIG. 1 shows a typical embodiment of the coaxial gear in a partially schematic sectional view.

In the following, typical embodiments of the invention will be described on the basis of the Figures, with the invention not being restricted to the exemplary embodiments, the scope of the invention being rather determined by the claims.

In the description of the embodiments, identical reference numerals for identical or similar parts are possibly used in various Figures and for various embodiments. In part, features already described in conjunction with other Figures are not mentioned or described repeatedly for reasons of clarity. For the purpose of clarity, partially not all of the respective features, for example the bearing segments or the tooth pins, are provided with a reference numeral.

In FIG. 1, a section of a typical embodiment of the invention is illustrated in a schematic sectional view. FIG. 1 shows a part of a coaxial gear 1 having a tooth system 5 oriented with respect to a rotational axis 3 of the coaxial gear 1. The tooth system 5 is realized as a tooth system of a crown wheel 18 revolving about the rotational axis 3. The crown wheel 18 is connected to a housing 31 of the coaxial gear 1 in a rotationally fixed manner.

The coaxial gear 1 comprises a tooth carrier 7, which is provided on an output shaft 34. The output shaft 34 is mounted on the housing 31 via a first bearing 33 to be rotatable about the rotational axis 3. The tooth carrier has axially oriented guideways 9, in each of which tooth pins 11 are accommodated. The tooth pins 11 are mounted along their respective longitudinal axes 13 within the guideways 9 to be axially displaceable with respect to the rotational axis 3.

The tooth pins each comprise a tooth head oriented for engaging with the tooth system 5, and a tooth base protruding from the guideway 9 of the respective tooth pin 11 and being mounted on a bearing segment 17. A tooth pin 11 furthermore comprises a tooth body between the tooth base and the tooth head, with the tooth body being at least in part accommodated within the guideway 9 of the tooth pin 11.

The tooth base of the tooth pin 11 having a recess 21 is mounted on a partially spherical cap-shaped elevation 19 of the bearing segment 17.

The bearing segments 17 each are mounted with a running surface 23 on their side facing away from the tooth pins on a roller bearing having rolling elements 27, which bearing is in turn mounted on a profiling 25 of a cam disc 15 of the coaxial gear 1. Of the roller bearing in FIG. 1 substantially a web of the cage 26 for the rolling elements 27 (these are partially obscured) can be seen in a cut. The rolling elements 27 are realized as needle rollers. In further embodiments, the rolling elements may be realized as cylinder rollers.

Figure 2:
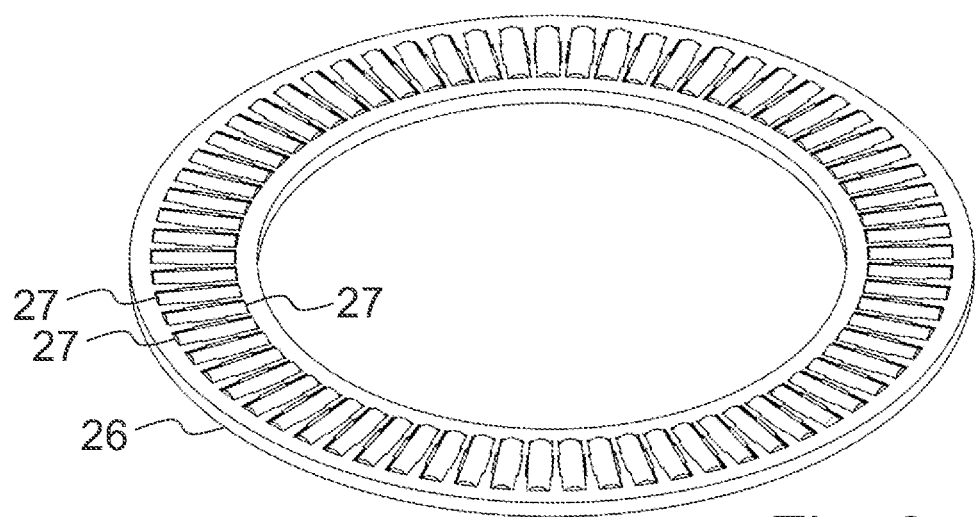
FIG. 2 shows a schematic view of the rolling elements and the cage of the embodiment of FIG. 1.

In FIG. 2, the cage 26 having the rolling elements 27 is again illustrated for better clarity. Like the anti-twist ring 29, the cage is made of permanently elastic plastics.

The cam disc 15 is provided on a drive shaft 36. The drive shaft 36 is mounted via a second bearing 35 rotatable about the rotational axis 3 on the tooth carrier 7 and thus indirectly on the housing 31 as well. The cam disc 15 is mounted via an axial bearing 32 by needle rollers with respect to the housing 31.

The profiling 25 of the embodiment of FIG. 1 is realized to be revolving around the rotational axis 3 and has two axial elevations in the direction of the tooth pins 11.

The profiling 25 has a variable inclination angle in the radial direction (straight line 45 in FIG. 1) to the rotational axis 3. The inclination angle designates the radially oriented proportion of the angle of a straight line perpendicular to the profiling at one point, which is the profiling vertical line 46, with respect to the rotational axis 3 of the coaxial gear.

In typical embodiments, the profiling rises and falls circumferentially in the axial direction, wherein the top surface or the profiling tilts radially to the inside and to the outside. The profiling typically tilts radially inwards at the elevations, into which the teeth of the tooth system are pushed in. The profiling tilts radially to the outside in particular between the elevations, when the teeth are pulled out from the tooth system. In typical embodiments, there is a a continuous transition of the inclination angle in between in each case.

Figure 3:
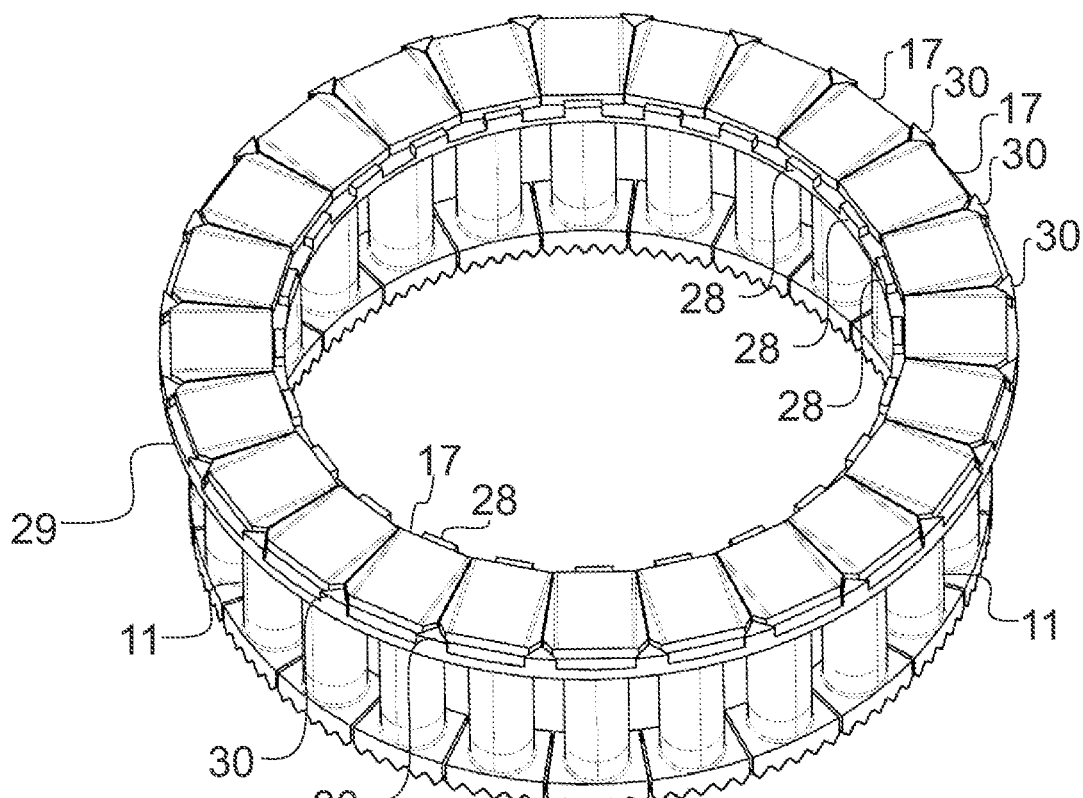
FIG. 3 shows a schematic view of the bearing segments, the tooth pins and the anti-twist ring of the embodiment of FIG. 1.

In FIG. 3, the bearing segments 17, the anti-twist ring 29, and the tooth pins 11 without tooth carriers and other components are shown for better clarity. The bearing segments are non-displaceable relative to the anti-twist ring 29, whereby they are prevented from twisting by inner lugs 28 and outer lugs 30 of the anti-twist ring 29.

In each case one of the inner lugs 28 supports a respective inner edge of a bearing segment 17 with respect to a radially inwards displacement. The radially outer corners 41 (see FIG. 5 and FIG. 6) of the bearing segments 17 are each flattened so as to be in engagement with the outer lugs 30 which are triangular in cross-section, so that a radially outwards movement and twisting are prevented in each case. Thereby, one of the outer lugs 30 is in engagement with two bearing segments 17 in each case.

Further details of the bearing segments 17, the anti-twist ring 29, and the tooth pins 11 will be explained in conjunction with the further FIGS. 4 to 7.

Figure 4:
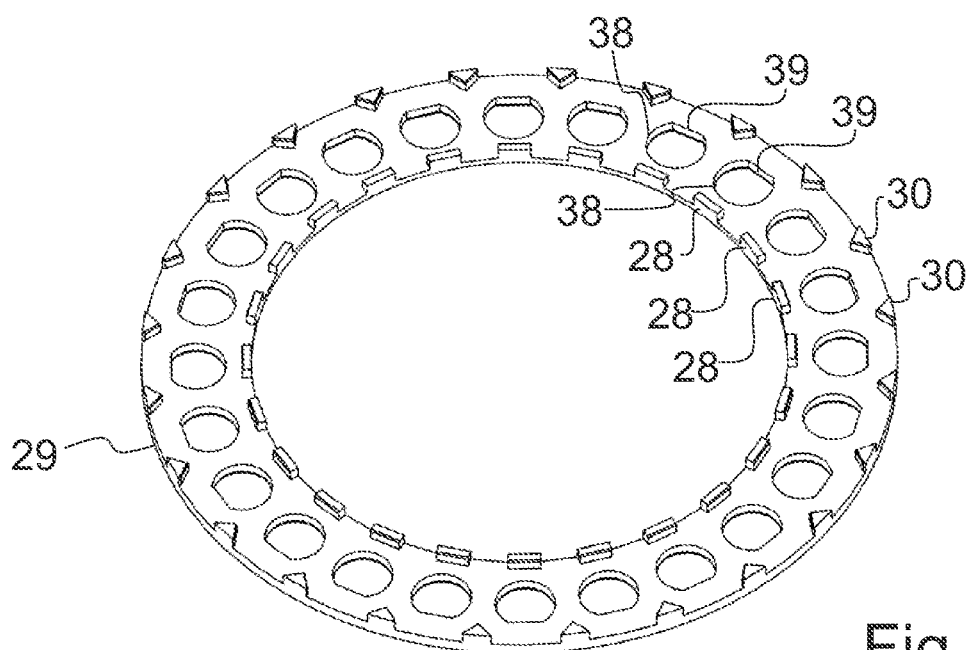
FIG. 4 shows a schematic view of the anti-twist ring of FIG. 3.

The anti-twist ring 29 is schematically illustrated in FIG. 4. The anti-twist ring has the inner lugs 28 and the outer lugs 30. Moreover, the anti-twist ring 29 has in each case an opening 38 for each of the tooth pins 11 (see FIG. 3, for example). At their radially outer sides, the openings 38 have a molding 39, which is straight in sections and protrudes into the otherwise circular ring-shaped cross-section of the opening 38. Each of the moldings 39 interacts respectively with a flattening of a tooth pin 11 (see FIG. 7).

In embodiments, an engagement with the correspondingly shaped opening having the molding may be performed by means of a non-circular cross-section of the tooth pin in the area of the tooth base, so that an anti-twist protection of the tooth pin about its longitudinal axis is achieved.

Figure 5:
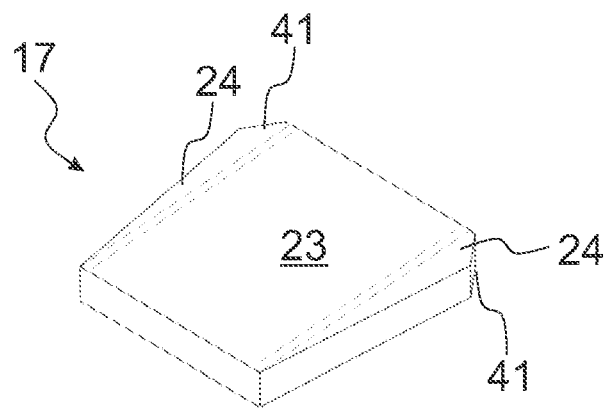
FIG. 5 shows a schematic view of a bearing segment of FIG. 3.
Figure 6:
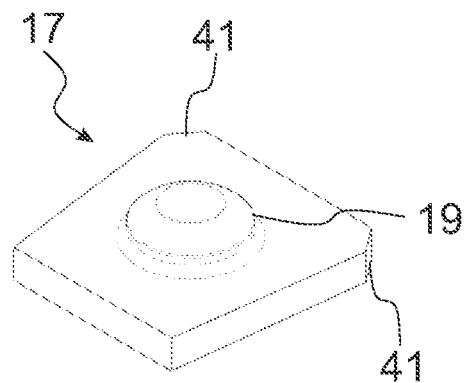
FIG. 6 shows a further schematic view of a bearing segment of FIG. 3.

In FIG. 5 and FIG. 6, a bearing segment 17 is in each case schematically shown from "below" (FIG. 5) and from "above" (FIG. 6). The flattened radially outer corners 41 are each disposed between a radially outer edge of a bearing segment 17 and one of the two edges pointing into the direction of revolution, and serve for engaging with the outer lugs 30 of the anti-twist ring.

As shown in FIG. 5, introduction chamfers 24 are present on the edges pointing in the direction of revolution in each case on the side of the running surface 23, which, by means of a rounded transition, facilitate an arrival of the rolling elements below the bearing segments 17.

In FIG. 6, the elevation 19 having the spherical cap-shaped portion is shown, which is disposed to be approximately central of the bearing segment 17. The edges pointing in the direction of revolution are not realized at a right angle to the other two edges, but are straight in the radial direction after having been inserted into the anti-twist ring. Due to the circular ring-shaped arrangement originating as a result of this, the bearing segments 17 can cover a largest possible surface and contribute to the running smoothness of the rolling elements.

Figure 7:
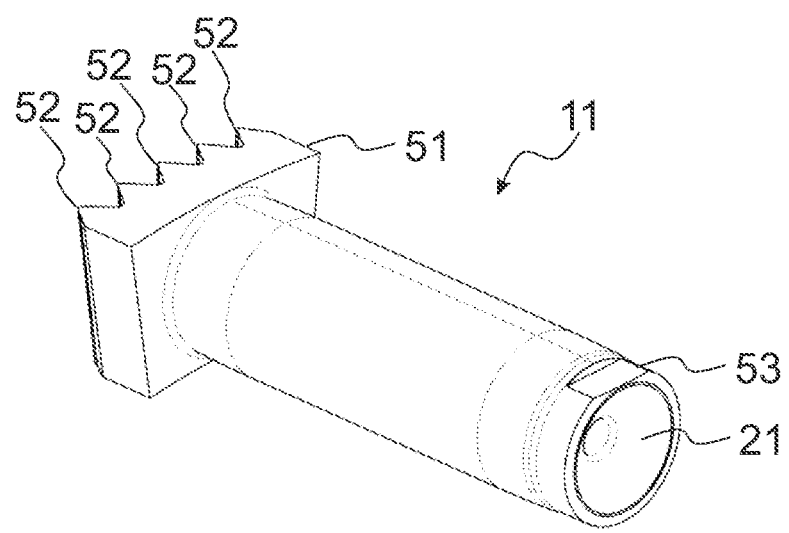
FIG. 7 shows a tooth pin of FIG. 3 in a schematic view.

In FIG. 7, a tooth pin 11 is schematically shown in an inclination view. The tooth pin 11 has a concave recess 21 on the tooth base, and a widened head area 51 having a plurality of teeth 52. By means of the widened head area 51, several teeth 52 are brought into engagement with the crown wheel 18, so that high torque can be transmitted via the teeth. Moreover, the flattening 53 in the area of the tooth base can be recognized in FIG. 7, by means of which twisting of the tooth pin 11 is prevented by engaging with the molding in a respective opening of the anti-twist ring.

Figure 8:
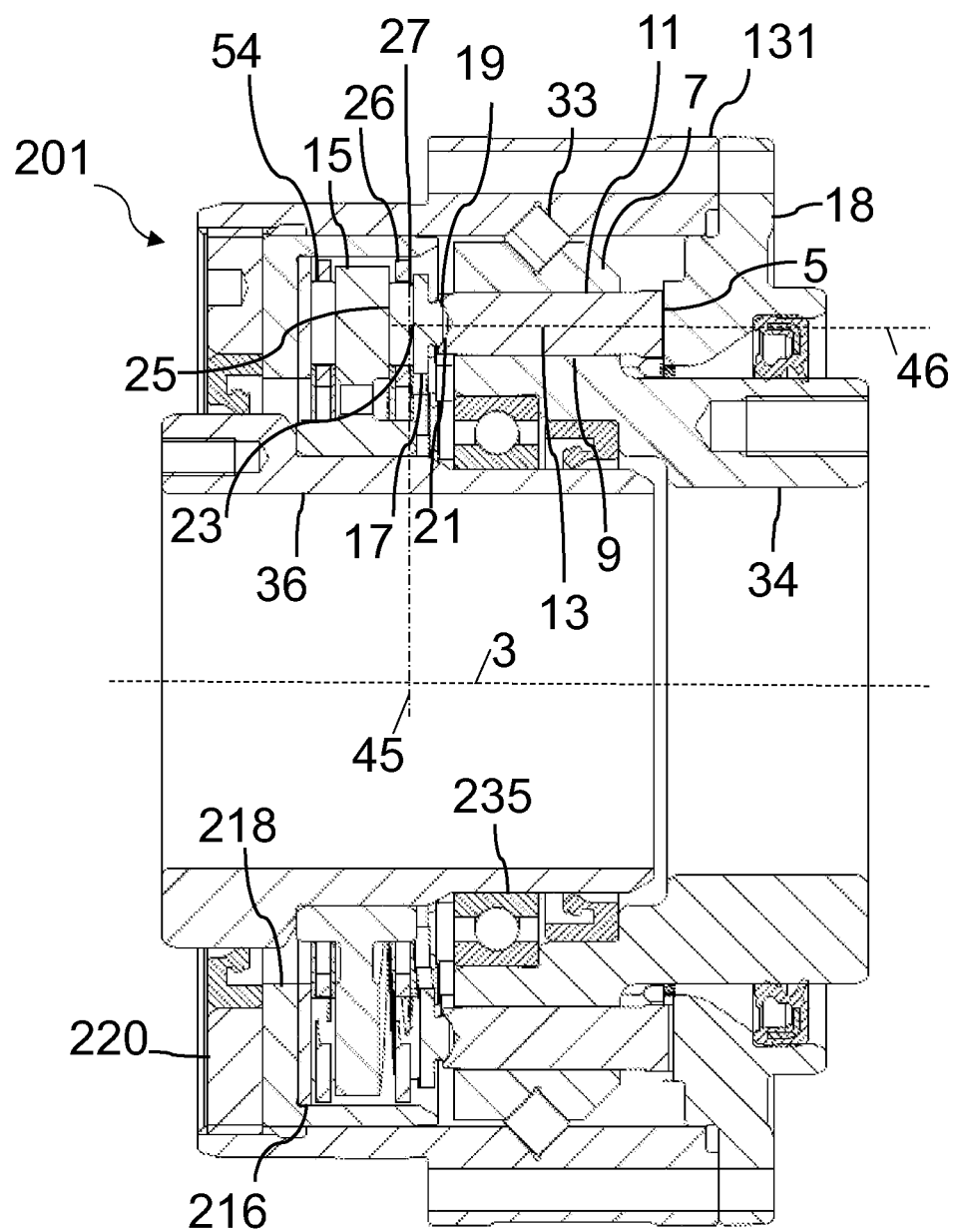
FIG. 8 shows a further typical embodiment of the coaxial gear in a schematic sectional view.

FIG. 8 shows a coaxial gear 201, which is similar to the coaxial gear 1 shown in FIG. 1, therefore only differentiating parts will be explained here. For a better visibility the anti-twist ring 29 is not shown in FIG. 8.

The coaxial gear 201 of FIG. 8 comprises a setting element 216, which rests axially on an abutment bearing pot 218.

The abutment bearing pot 218 has a through opening for bushing of an input shaft 115, which is fixed to the cam disc 15.

In contrast to the embodiment of FIG. 1, the embodiment of FIG. 8 shows cam disc 15 and input shaft 115 being two pieces, not integral.

In contrast to the embodiment of FIG. 1, the embodiment of FIG. 8 uses a deep groove ball bearing 235 as a second bearing 35.

On its outer circumference the abutment bearing pot 218 rests on an inner surface of a housing 131, which has a cylindrical form, and can be axially displaced along the housing 131. The ring shaped setting element 216 rests on the bottom of the abutment bearing pot 218 and serves for bearing of the rolling bodies 54, which are bearing the cam disc 15.

The abutment bearing pot 218 in turn is axially supported by a positioning nut 220, which can be moved axially by screwing into the housing 131, and is therefore adjustable in relation to a tooth carrier or an input shaft.

By axial adjustment of the positioning inside the housing the components of the coaxial gear, like setting element, abutment port, teeth, bearing segments, cam disc, rolling bodies, housing, tooth carrier or the toothing systems need not to be specially selected in regard to their axial thickness, to adjust a backlash of the coaxial gear.

The invention claimed is:

1. A coaxial gear (1), comprising
an axially oriented tooth system (5) with respect to a rotational axis (3) of the coaxial gear (1),
a tooth carrier (7) having axially oriented guideways (9),
tooth pins (11) received within the guideways (9) for engaging with the tooth system (5), wherein the tooth pins (11) are axially oriented within the guideways (9) by their respective longitudinal axes and are mounted within the guideways (9) in an axially displaceable manner, and
a cam disc (15) rotatable about the rotational axis (3) for axially driving the tooth pins (11),
wherein a plurality of bearing segments (17) is disposed between the cam disc (15) and the tooth pins (11) for bearing the tooth pins (11), and
wherein, on a side facing the tooth pins, the bearing segments (17) have an elevation (19) formed as a spherical cap for bearing the respective tooth pin (11).

2. The coaxial gear (1) according to claim 1, wherein rolling elements (27) are disposed between the cam disc (15) and the bearing segments (17).

3. The coaxial gear (1) according to claim 2, wherein a center point of the spherical cap coincides with a center of a running surface of the bearing segment.

4. The coaxial gear (1) according to claim 2, wherein the rolling elements are formed as cylindrical rollers.

5. The coaxial gear (1) according to claim 1, wherein the tooth pin (11) on its tooth base on the side of the bearing segment has a recess (21) formed as a concave spherical shape.

6. The coaxial gear (1) according to claim 5, wherein a radius of the spherical cap of the elevation of the bearing segment is different from a sphere radius of the spherical shape of the tooth base of the tooth pin (11).

7. The coaxial gear (1) according to claim 2, wherein the rolling elements are kept in a cage (26), which is suitable to follow a stroke of the cam disc in a permanently elastic manner.

8. The coaxial gear (1) according to claim 1, wherein the bearing segments (17) have spaced side edges each running along a radius.

9. The coaxial gear (1) according to claim 8, wherein the bearing segments have a running surface facing away from the tooth pins, which respectively have introduction chamfers (24) in the area of the edges.

10. The coaxial gear (1) according to claim 1, wherein the tooth pins (11) each have a widened head area (51) as compared to a tooth body of the tooth pins (11).

11. The coaxial gear (1) according to claim 1, wherein the cam disc (15) has a profiling (25) having a variable inclination angle of up to 10° of a vertical line (45) of the profiling towards the rotational axis (3).

12. The coaxial gear (1) according to claim 1, further comprising an anti-twist ring (29) disposed between the tooth pins (11) and the bearing segments (17).

13. The coaxial gear (1) according to claim 12, wherein the tooth pins (11) have a circular tooth body in cross-section, and a non-circular cross-section in an area of a tooth base for engaging with a correspondingly shaped opening in the anti-twist ring (29).

14. The coaxial gear (1) according to claim 12, wherein the anti-twist ring (29) prevents the bearings segments (17) from twisting relative to one another.

15. The coaxial gear (1) according to claim 12, wherein the anti-twist ring (29) comprises lugs in a direction of the cam disc (15) for positionally securing the bearing segments (17).

16. The coaxial gear (1) according to claim 1, wherein the bearing segments (17) are realized as circular ring portions.

* * * * *